United States Patent
Gaiser et al.

(10) Patent No.: US 11,781,648 B2
(45) Date of Patent: Oct. 10, 2023

(54) PARKING LOCK FOR A TRANSMISSION OF AN ELECTRIC OR HYBRID VEHICLE

(71) Applicant: Mahle International GmbH, Stuttgart (DE)

(72) Inventors: Benjamin Gaiser, Stuttgart (DE); Hermann Hoffmann, Filderstadt (DE)

(73) Assignee: Mahle International GmbH (DE)

( * ) Notice: Subject to any disclaimer, the term of this patent is extended or adjusted under 35 U.S.C. 154(b) by 10 days.

(21) Appl. No.: 17/204,927

(22) Filed: Mar. 17, 2021

(65) Prior Publication Data

US 2021/0293334 A1 Sep. 23, 2021

(30) Foreign Application Priority Data

Mar. 18, 2020 (DE) .......................... 102020203452.4

(51) Int. Cl.
*F16H 63/34* (2006.01)
*F16H 57/04* (2010.01)

(52) U.S. Cl.
CPC ..... *F16H 63/3425* (2013.01); *F16H 57/0404* (2013.01); *F16H 63/3466* (2013.01); *F16H 63/3475* (2013.01)

(58) Field of Classification Search
CPC ............. F16H 63/3425; F16H 63/3466; F16H 63/3475
See application file for complete search history.

(56) References Cited

U.S. PATENT DOCUMENTS

2009/0173594 A1* 7/2009 Joshi ................... F16H 63/3416
192/219.5
2020/0023818 A1* 1/2020 Hanker ................... B60T 7/045
(Continued)

FOREIGN PATENT DOCUMENTS

| CN | 104776220 | 7/2015 |
|---|---|---|
| DE | 4127991 A1 | 2/1993 |
| DE | 102016101486 | 8/2017 |

(Continued)

OTHER PUBLICATIONS

English abstract for CN-104776220.
English abstrct for DE-102016101486.
English abstract for DE-4127991.

*Primary Examiner* — Lori Wu
(74) *Attorney, Agent, or Firm* — Fishman Stewart PLLC

(57) ABSTRACT

A parking lock for a transmission of an electric or hybrid vehicle is disclosed. The parking lock includes a lock device including an actuatable actuating element and a setting element adjustable between a deployed position and a retracted position. The locking device is configured such that, in response to repeated actuation of the actuating element, the setting element is, via a coupling mechanism, adjusted alternately between the retracted position and the deployed position. A camshaft is provided with a cam arranged on the camshaft that is connected in terms of drive to the lock device. A ratchet wheel is provided with a pawl that is adjustable between an engagement position, where the pawl blocks a rotation of the ratchet wheel, and a release position, where the blocking of the ratchet wheel is released. The setting element adjusts the pawl between the engagement position and the release position.

20 Claims, 6 Drawing Sheets

(56) References Cited

U.S. PATENT DOCUMENTS

2020/0166133 A1\* 5/2020 Morise .................. F16H 25/186
2020/0309262 A1\* 10/2020 Kirchner ................. B60T 1/062

FOREIGN PATENT DOCUMENTS

| DE | 102016101486 A1 \* | 8/2017 | ......... F16H 63/3483 |
| WO | WO-2009/047520 | 4/2009 | |
| WO | WO-2017216230 A1 \* | 12/2017 | .............. B60T 1/005 |

\* cited by examiner

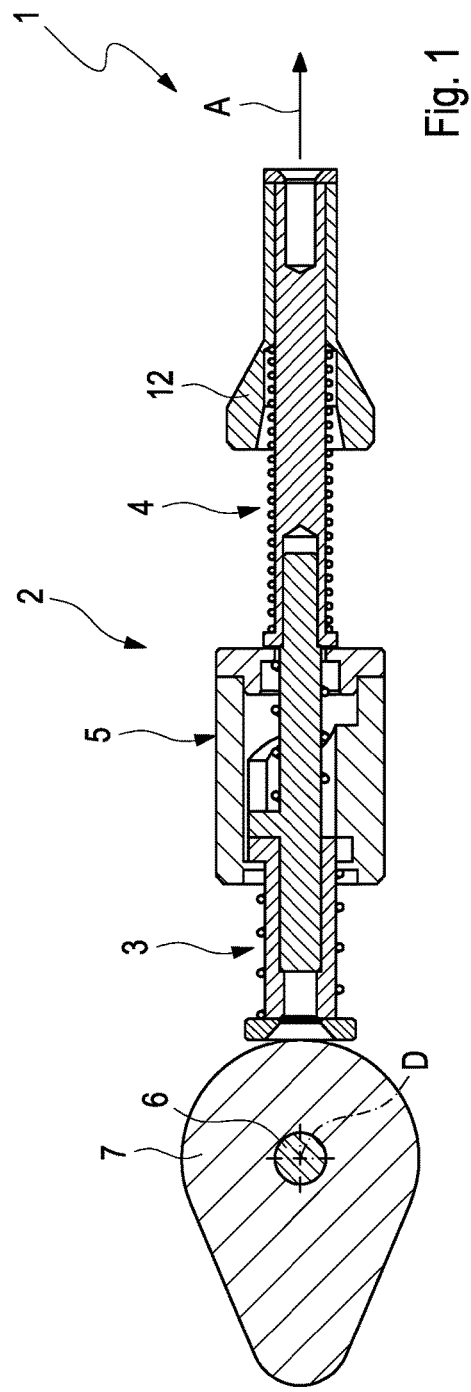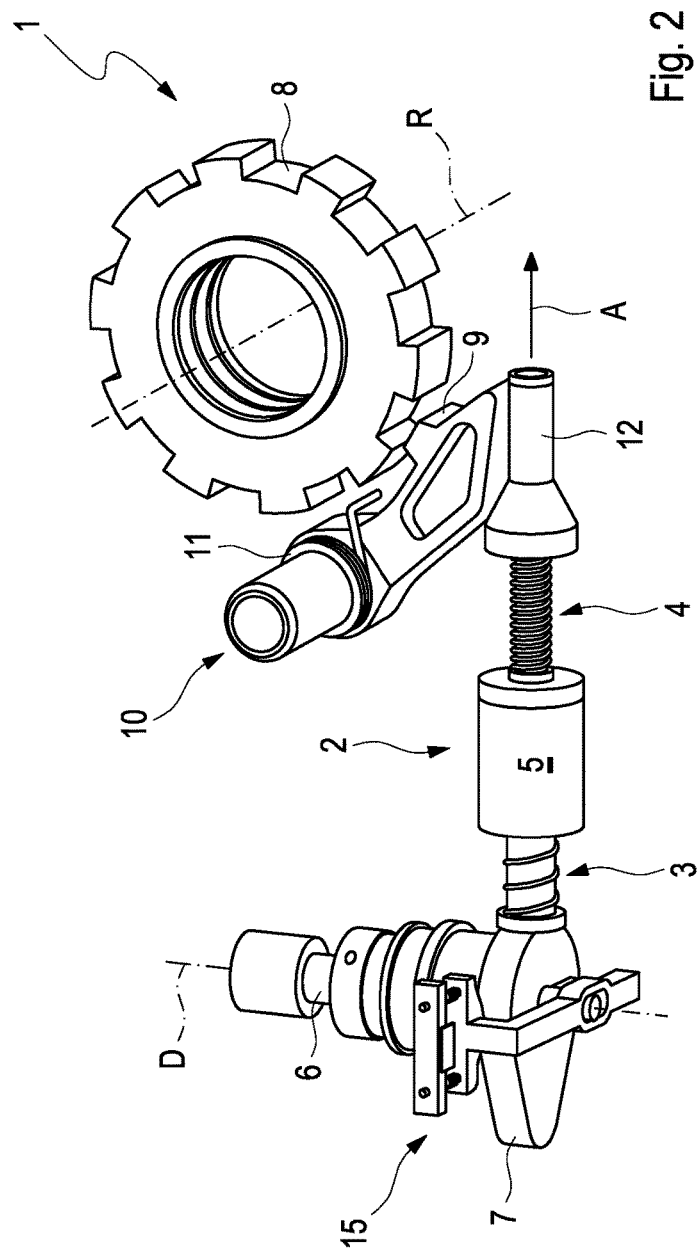

PARKING LOCK FOR A TRANSMISSION OF AN ELECTRIC OR HYBRID VEHICLE

CROSS-REFERENCE TO RELATED APPLICATION

This application claims priority to German Application No. DE 10 2020 203 452.4 filed Mar. 18, 2020, the contents of which are hereby incorporated by reference in its entirety.

TECHNICAL FIELD

The invention relates to a parking lock for a transmission of an electric or hybrid vehicle and to a transmission having a parking lock of said type.

BACKGROUND

Parking locks are installed in many motor vehicles, in particular also in electric or hybrid vehicles with automatic transmissions, and form a subsystem of a transmission, which has the task of securing the parked motor vehicle against rolling away in an undesired manner. In the case of automatic transmissions, this is commonly realized by virtue of the parking lock being transferred into the park position "P". Here, by means of an electrically driven actuator, a lock mechanism is actuated which engages a pawl into a parking lock wheel in positively locking fashion, wherein said parking lock wheel is connected to a motor output shaft, that is to say generally to a drive shaft of the transmission.

The use of an electrically driven actuator for the parking lock however proves to be relatively expensive, because this actuator is used exclusively for the parking lock. Such an electrically driven actuator therefore increases the costs for the parking lock as a whole and thus for the transmission as a whole, and also requires a large amount of structural space.

SUMMARY

It is therefore an object of the present invention to create an improved embodiment for a parking lock, which is in particular inexpensive to produce.

Said object is achieved by means of the subject matter of the independent patent claim(s). The dependent patent claims relate to preferred embodiments.

It is accordingly a basic concept of the invention to design a parking lock for a transmission such that the drive of a media pump, in particular of an oil pump of the transmission, can be used to also actuate the parking lock. For this purpose, it is proposed according to the invention that a parking lock, which as part of a lock mechanism may have a conventional ratchet wheel with pawl, be structurally designed such that the output-side alternating locking and unlocking of the ratchet wheel can be effected by means of an input-side rotational movement in one and the same direction. Thus, the—typically electric—drive of the media pump, which generates a rotational movement in a drive shaft in the same direction—that is to say clockwise or counterclockwise in a plan view of the shaft—can be used for adjusting the lock mechanism.

According to a first aspect, a parking lock according to the invention for a transmission comprises a lock device which has an actuatable actuating element and a setting element which is adjustable between a deployed and a retracted position. The lock device is designed such that, as a result of repeated actuation of the actuating element, the setting element is, by means of a coupling mechanism, adjusted alternately between the retracted position and the deployed position. The parking lock furthermore comprises a camshaft which is rotatable about an axis of rotation and on which there is arranged a cam which is connected in terms of drive to the lock device. The cam and the lock device are designed and coordinated with one another such that, when the camshaft rotates, the actuating element is actuated by the cam. Thus, also, the setting element is adjusted between the retracted position and the deployed position. Furthermore, the parking lock comprises a ratchet wheel, which is rotatable about a wheel axis, and a pawl, which interacts with the ratchet wheel. Said pawl is adjustable between an engagement position, in which it blocks a rotation of the ratchet wheel, and a release position, in which the blocking of the ratchet wheel is eliminated, such that the ratchet wheel can rotate about the wheel axis. The setting element of the lock device is, according to the invention, designed to adjust the pawl between the engagement position and the release position.

In a preferred embodiment, the setting element is connected in terms of drive to the pawl such that the pawl has been adjusted into the engagement position when the setting element is situated in the deployed position, and has been adjusted into the release position when the setting element is situated in the retracted position. A reversed assignment is also conceivable. In this case, the pawl has been adjusted into the release position when the setting element is situated in the deployed position, and has been adjusted into the engagement position when the setting element is situated in the retracted position. In both variants of this embodiment, the adjustment mechanism is implemented in particularly simple form.

In one advantageous refinement, the lock device comprises a preload unit which preloads the pawl in the direction of the release position. In this way, it is ensured that, when the actuator is inactive, the parking lock does not block the transmission. For this purpose, the preload unit may particularly preferably comprise or be a resiliently elastic component.

It is particularly preferable if the operative connection, that is to say the coupling mechanism, between the actuating element and the setting element is formed by a mechanism which corresponds to the functional principle of a ballpoint pen adjustment mechanism. Such a coupling mechanism requires only very little structural space, in particular laterally, that is to say in planes perpendicular to the axis of rotation.

It is particularly preferable if the actuating element and the setting element are designed to be actuatable or adjustable along a common axial direction. Such a coupling mechanism requires little structural space, in particular laterally, that is to say in planes perpendicular to the axial direction.

The setting element may expediently have a contact section which is mechanically in contact with the pawl in order to form the drive connection thereto and which, for the adjustment of the pawl, tapers preferably conically along the axial direction.

In a further preferred embodiment, the cam may be arranged rotationally conjointly on the camshaft.

In one advantageous refinement, the camshaft is connected in terms of drive to the cam by means of a preferably mechanically or electrically or electromechanically activatable delay device. The delay device is particularly preferably designed such that, after being activated, it temporarily—that is to say over a particular period of time—blocks a rotational movement of the cam even when the camshaft is rotating. Thus, with a parking lock refined in this way, it is possible for the driver of a motor vehicle—in particular when launching on an uphill gradient—to change over from the brake pedal to the accelerator pedal without the vehicle immediately rolling away.

The delay device particularly expediently comprises an adjustable blocking element which interacts with a stop provided on the cam such that, as a result of activation of the delay device, said blocking element is adjusted into a blocking position in which it blocks a movement of the stop and thus of the cam. In this variant, the delay device has a preload device which preloads the blocking element away from the blocking position. In this variant, the delay device furthermore has a damping device which counteracts the movement of the blocking element away from the blocking position as generated by the preload device, such that the elimination of the blockage owing to the movement of the blocking element away from the blocking position takes place in a time-delayed manner.

A parking lock according to the invention for a transmission according to a second aspect of the invention comprises a drive shaft, which is rotatable about an axis of rotation, and an output shaft, which is likewise rotatable about the axis of rotation. The output shaft is connectable in terms of drive or connected in terms of drive to the output shaft by means of a planetary stage. The planetary stage comprises a planet carrier, which is designed to be rotatable about the axis of rotation, and an internal gear which is designed to be rotatable about the axis of rotation, which planet carrier and internal gear are each adjustable—independently of one another—by means of an electromagnetic lock device between a blocking state, in which a rotational movement of the planet carrier and/or of the internal gear is blocked, and a release state, in which the rotational movement of the internal gear and/or of the planet carrier is possible.

In a preferred embodiment, the planetary stage is designed such that, when the planet carrier is blocked and the internal gear is released, a rotational movement of the drive shaft about the axis of rotation in a first direction of rotation causes a rotational movement of the output shaft about the axis of rotation in a second direction of rotation which is opposite to the first direction of rotation. Alternatively or in addition, in this refinement, the planetary stage may be designed such that, when the internal gear is blocked and the planet carrier is released, a rotational movement of the drive shaft about the axis of rotation in a first direction of rotation is converted into a rotational movement of the output shaft about the axis of rotation likewise in the first direction of rotation.

In a further preferred embodiment, the electromagnetic lock device comprises an electrically energizable first electromagnet and a first lock element which interacts with the first electromagnet, which first electromagnet and first lock element are designed and coordinated with one another such that the electrically energized electromagnet adjusts the first lock element into a locking position in which it, preferably by frictional engagement, blocks the rotational movement of the planet carrier such that the latter is situated in the blocking state. Alternatively or in addition, in this embodiment, the electromagnetic lock device comprises an electrically energizable second electromagnet and a second lock element which interacts with the second electromagnet, which second electromagnet and second lock element are designed and coordinated with one another such that the electrically energized second electromagnet adjusts the second lock element into a locking position in which it, preferably by frictional engagement, blocks the rotational movement of the internal gear such that the latter is situated in the blocking state. The electrical energization of the electromagnet for the adjustment of the locking elements can be performed by means of an open-loop/closed-loop control unit.

In one advantageous refinement, the first lock element is arranged axially between the first electromagnet and the planet carrier and is adjustable by means of the first electromagnet axially between the blocking position and a release position, in which the rotational movement of the planet carrier is enabled.

It is expedient if the electromagnets and the associated lock elements are coordinated with one another such that, when the electromagnet is not electrically energized, the associated lock element is situated in the release position.

Alternatively or in addition, in this refinement, the second lock element is arranged axially between the second electromagnet and the internal gear and is adjustable by means of the second electromagnet axially between the blocking position and a release position in which the rotational movement of the internal gear is enabled. Here, the common axis of rotation extends along the axial direction.

The invention furthermore relates to a transmission having a transmission output and having a parking lock as presented above. The above-discussed advantages of the parking lock according to the invention are thus also applicable to the transmission according to the invention. Furthermore, the transmission according to the invention comprises a filter device for filtering transmission oil, and an electrically driven conveying device for driving the transmission oil through the filter device. Furthermore, the transmission comprises an electric drive for driving the conveying device, wherein the electric drive is, for the purposes of activating the parking lock, designed to be connectable in terms of drive or connected in terms of drive to the lock device of said parking lock.

Further important features and advantages of the invention will emerge from the subclaims, from the drawings and from the associated figure description on the basis of the drawings.

It is self-evident that the features mentioned above and the features yet to be discussed below may be used not only in the respectively specified combination but also in other combinations or individually without departing from the scope of the present invention.

Preferred exemplary embodiments of the invention are illustrated in the drawings and will be discussed in more detail in the following description, wherein the same reference designations relate to identical or similar or functionally identical components.

BRIEF DESCRIPTION OF THE DRAWINGS

In the drawings, in each case schematically:

FIGS. 1 and 2 show an example of a parking lock according to the invention with delay device according to the first aspect of the invention.

DETAILED DESCRIPTION

Figure 3:
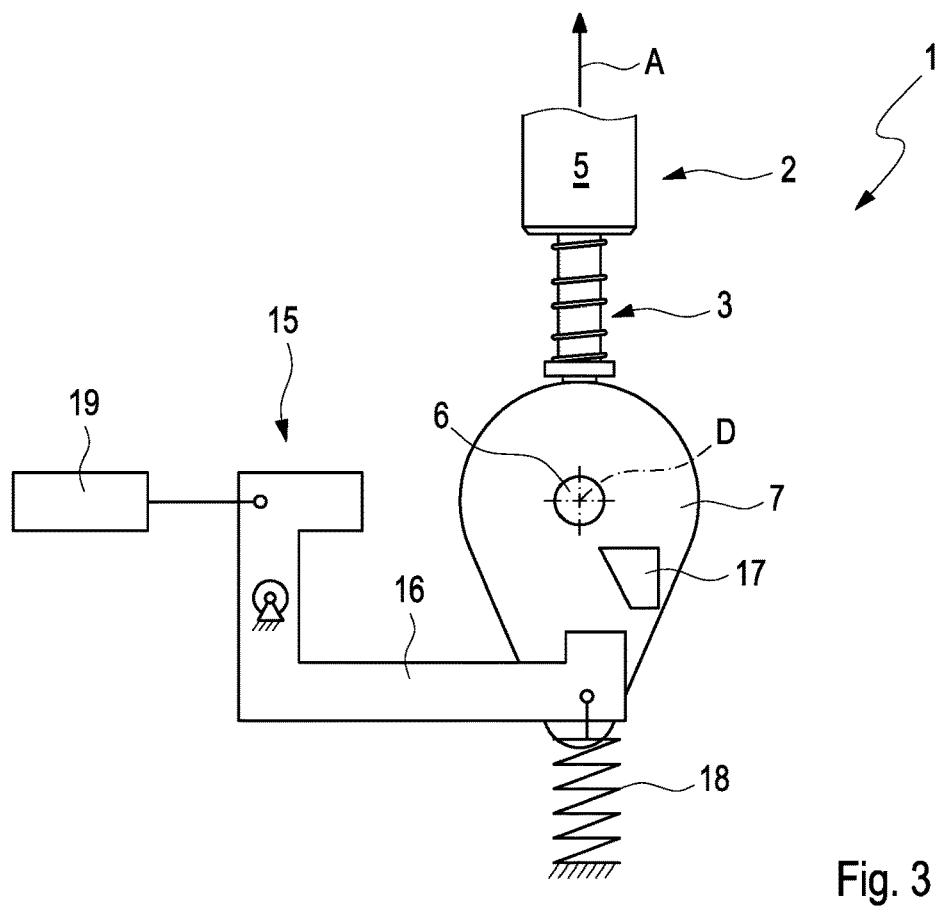
FIGS. 3 and 4 show the delay device of FIG. 2 in separate detail illustrations.

FIG. 1 illustrates an example of a parking lock 1 according to the invention for a transmission according to the first aspect of the invention in a sectional illustration and in a perspective illustration. The parking lock 1 accordingly comprises a lock device 2, which has an externally actuatable actuating element 3 and a setting element 4 which is adjustable between a deployed position and a retracted position. The parking lock 1 is designed such that, as a result of repeated actuation of the actuating element 3, the setting element 4 is, by means of a mechanical coupling mechanism 5, adjusted alternately between the retracted position and the deployed position. The operative connection between the actuating element 3 and the setting element 4 of the lock device 2 is formed by an adjusting mechanism which follows the functional principle of a mechanism for adjusting a ballpoint pen. The functioning of such a mechanism is known and is not the core of the invention described here, such that an explanation of the basic functioning of said mechanism will not be given here. In the case of the lock device 2 described here, the actuating element 3 and the setting element 4 are actuatable or adjustable along a common axial direction A.

The parking lock 1 furthermore comprises a camshaft 6 which is designed to be rotatable about an axis of rotation D. Arranged rotationally conjointly on the camshaft 6 is a cam 7, which is connected in terms of drive to lock device 2. The connection in terms of drive is implemented such that, when the camshaft 6 rotates, the cam 7, which likewise rotates, actuates the actuating element 3.

Furthermore, the parking lock 1 as per FIG. 2 comprises a ratchet wheel 8, which is designed to be rotatable about a wheel axis R, and a pawl 9. The pawl 9 is adjustable between an engagement position, in which it blocks a rotation of the ratchet wheel 8 about the wheel axis R, and a release position, in which the blocking of the ratchet wheel 8 is eliminated such that the latter can rotate about the wheel axis R. The setting element 4 is designed to adjust the pawl 9 between the engagement position and the release position.

The pawl 9 is connected in terms of drive to the setting element 4 such that the pawl 9 has been adjusted into the engagement position when the setting element 4 is situated in the deployed position, and has been adjusted into the release position when the setting element 4 is situated in the retracted position. In one variant, a reversed interaction is also possible. In this case, the pawl 9 has been adjusted into the release position when the setting element 4 is situated in the deployed position, and has been adjusted into the engagement position when the setting element 4 is situated in the retracted position.

As illustrated in FIG. 1, the lock device 2 comprises a preload unit 10 which preloads the pawl 9 in the direction of the release position. It is ensured in this way that, in the absence of action of the lock device 2, the parking lock 1 is inactive. The preload device 10 may comprise a resiliently elastic component 11, for example a spiral spring.

In the example scenario, the axis of rotation D runs perpendicular to the axial direction A. In the example scenario, the wheel axis R likewise runs perpendicular to the axial direction A.

As can be seen in FIG. 2, the setting element 4 has a contact section 4 which is mechanically in contact with the pawl 9 in order to form the drive connection thereto. For the adjustment of the pawl, the contact section 12 tapers conically along the axial direction A. An axial adjustment of the contact section 12 in the axial direction A thus leads to a movement of the pawl 9 from the release position into the engagement position. Conversely, an axial adjustment of the contact section 12 counter to the axial direction A leads to a movement of the pawl 9 from the engagement position into the release position.

In the illustration of FIG. 3, the parking lock 1 may additionally comprise an in particular mechanically, electrically or electromechanically activatable delay device 15, by means of which the camshaft 6 is connected in terms of drive to the cam 7. The delay device 15 is designed such that, after being activated, it temporarily blocks a rotational movement of the cam 7 even when the camshaft 6 is rotating. For this purpose, it is necessary for the cam 7 to be designed to be rotatable relative to the camshaft 6. Thus, a deactivation of the parking lock 1 by adjustment of the pawl 9 into the release position is prevented temporarily, that is to say for a particular period of time, even when the camshaft 6 is rotating.

The construction and functioning of the delay device 15 will be discussed below on the basis of FIGS. 3 and 4. The delay device 15 comprises an adjustable blocking element 16 which interacts with a stop 17 provided on the cam 7 such that, as a result of activation of the delay device 15, said blocking element is adjusted into a blocking position in which it blocks a movement of the stop 17 and thus of the cam 7. Furthermore, the delay device 15 has a preload device 18 which preloads the blocking element away from the blocking position into a non-blocking position, in which the blocking element does not prevent the movement of the stop 17 or cam 7.

In the example of FIG. 3, the delay device 15 also has a damping device 19 (merely schematically indicated in FIG. 3) which counteracts the movement of the blocking element 16 away from the blocking position as generated by the preload device 18, such that the elimination of the blockage owing to the movement of the blocking element 16 away from the blocking position takes place in a time-delayed manner.

Figure 4:
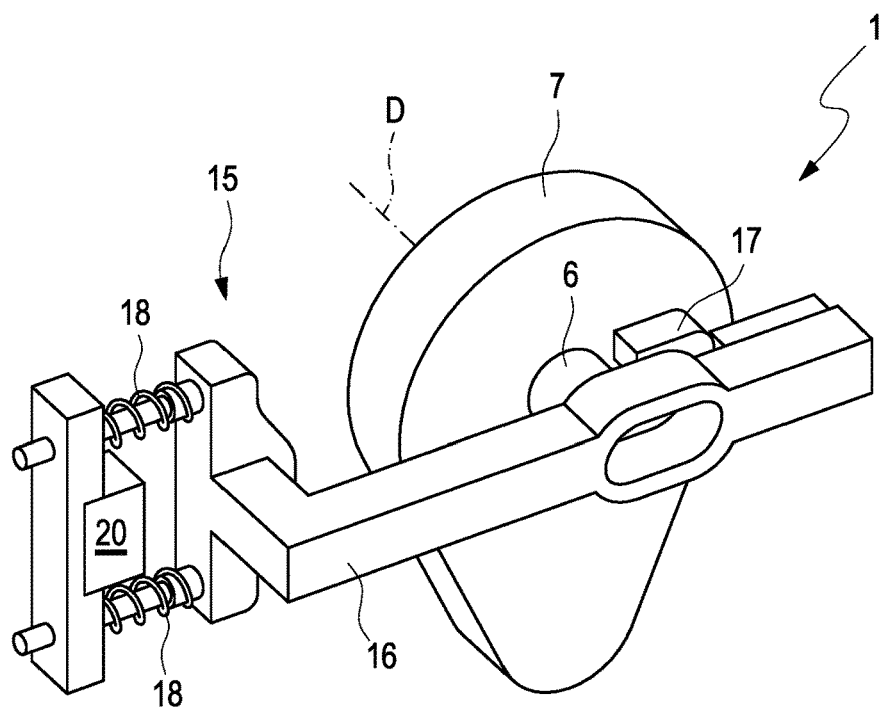

In the example of FIG. 4, instead of the damping device 19 of FIG. 3, an electromagnet 20 is used to effect the time-delayed elimination of the blockage owing to the movement of the blocking element 16 away from the blocking position. A delay device 15 designed as per FIG. 4 can also be seen in the illustration of FIG. 2.

Figure 5:
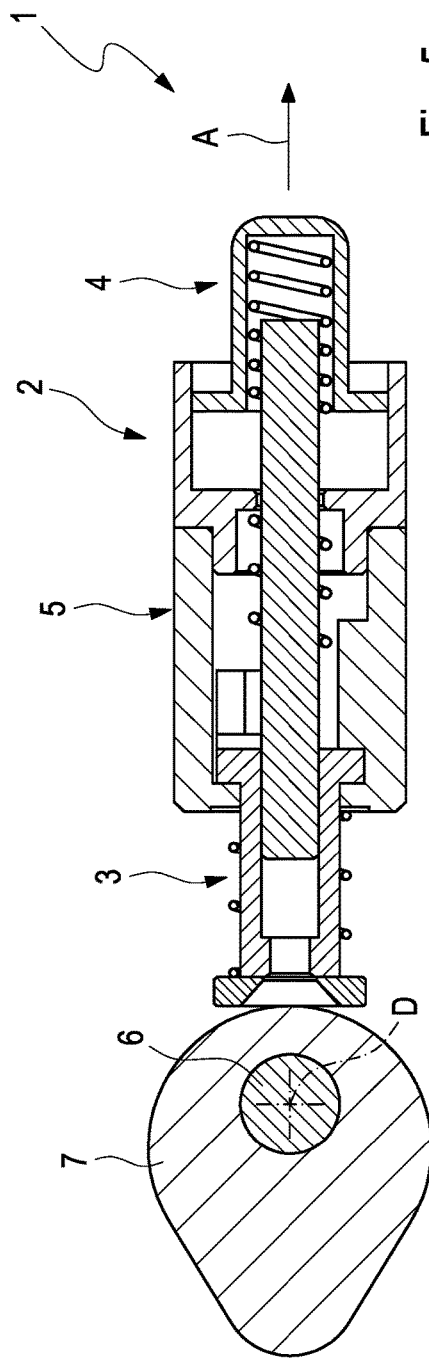
FIGS. 5 and 6 show a simplified variant of the example of FIG. 2 in various views.
Figure 6:
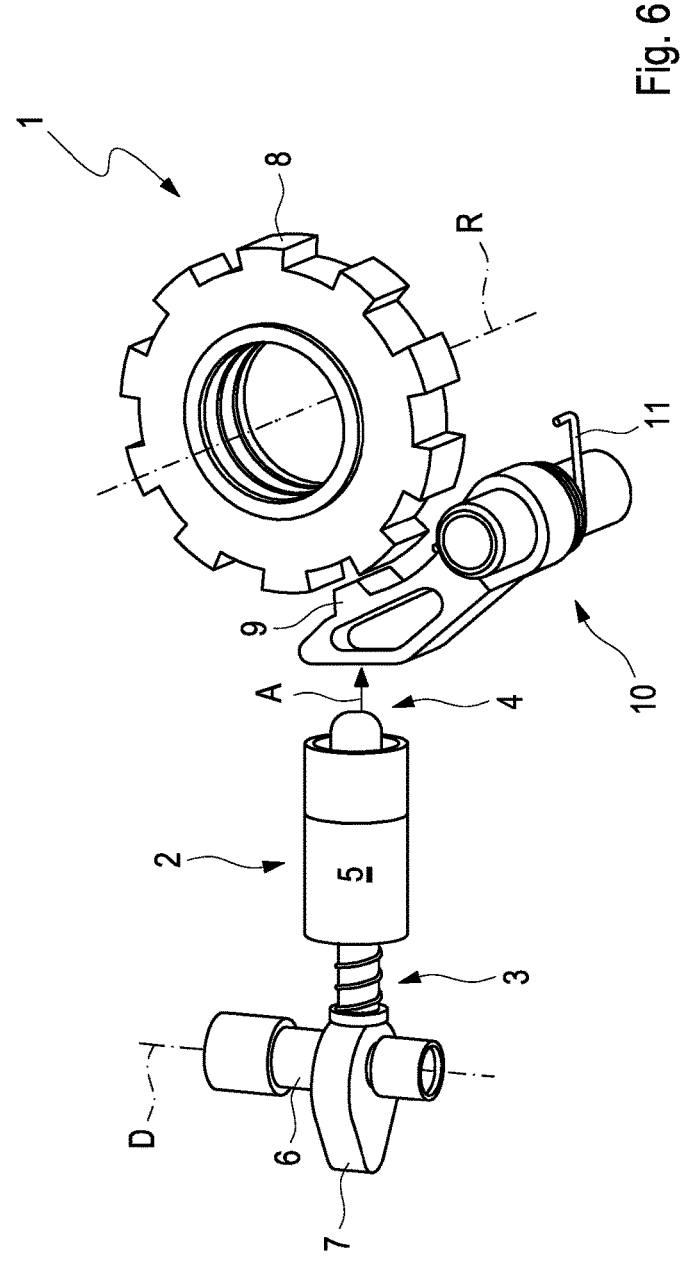

FIGS. 5 and 6 show a simplified example of the parking lock 1 as per FIGS. 1 and 2. In this variant, by contrast to the example of the cam 7 of FIGS. 1 and 2, the damping device 19 has been omitted. Furthermore, in this example, the conical taper of the contact section 12 has also been omitted.

Figure 7:
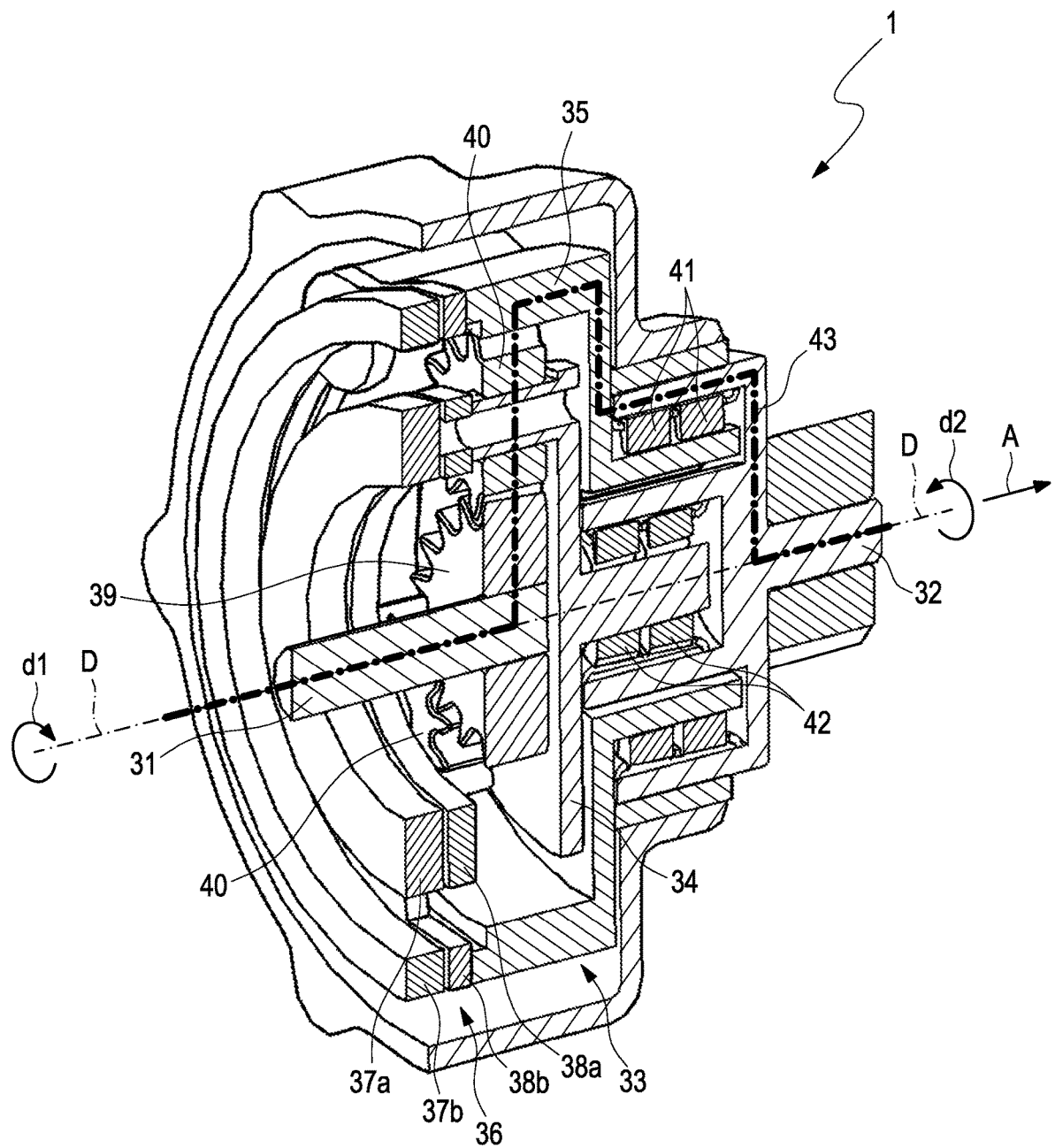
FIGS. 7 and 8 show an example of a parking lock according to the invention with planetary stage according to the second aspect of the invention.

FIG. 7 illustrates an example of an inventive parking lock 1 for a transmission according to the second aspect of the invention. Accordingly, the parking lock 1 comprises a drive shaft 31, which is rotatable about an axis of rotation D, and an output shaft 32, which is likewise rotatable about the axis of rotation D and which is connected in terms of drive to the output shaft 32 by means of a planetary stage 33. The axis of rotation D extends along an axial direction A. The planetary stage 33 is designed such that, when the planet carrier 34 is blocked and the internal gear 35 is released, a rotational movement of the drive shaft 31 about the axis of rotation D in a first direction of rotation d1 causes a rotational movement of the output shaft 32 about the axis of rotation D along a second direction of rotation d2 which is opposite to the first direction of rotation d1. The planetary stage 33 is furthermore also designed such that, when the internal gear 35 is blocked and the planet carrier 34 is released, a rotational movement of the drive shaft 31 about the axis of rotation D along a first direction of rotation d1 causes a rotational movement of the output shaft 32 about the axis of rotation D likewise in the first direction of rotation d1.

For this purpose, the planetary stage 33 comprises a planet carrier 34, which is designed to be rotatable about the axis of rotation D, and a ring-shaped internal gear 35, which is likewise designed to be rotatable about the axis of rotation D. Both the planet carrier 34 and the internal gear 35 are—independently of one another—adjustable by means of an electromagnetic lock device 36 in each case between a blocking state, in which a rotational movement of the planet carrier 34 or of the internal gear 35 respectively is blocked, and a release state, in which the rotational movement of the planet carrier 34 or of the internal gear 35 respectively is possible, that is to say enabled. For this purpose, the electromagnetic lock device 36 comprises an electrically energizable first electromagnet 37a and a ring-shaped first lock element 38a which interacts with the first electromagnet 37a by magnetic interaction.

The first electromagnet 37a and the first lock element 38a are designed and coordinated with one another such that the electrically energized electromagnet 37a adjusts the first lock element 38a by magnetic interaction into a locking position in which it, for example by frictional engagement, blocks the rotational movement of the planet carrier such that the latter is situated in the blocking state. Furthermore, the electromagnetic lock device 36 comprises an electrically energizable, ring-shaped second electromagnet 37b and a ring-shaped, second lock element 38b which interacts with the second electromagnet 37b by magnetic interaction. The second electromagnet 37b and the second lock element 38b are designed and coordinated with one another such that the electrically energized second electromagnet 37b adjusts the second lock element 38b by magnetic interaction into a locking position in which it, for example by frictional engagement, blocks the rotational movement of the internal gear 35 such that the latter is situated in the blocking state.

As illustrated in FIG. 7, the first lock element 38a is arranged along the axial direction between the first electromagnet 37a and the planet carrier 34 and is adjustable by means of the first electromagnet 37a in the axial direction A between the blocking position and a release position in which the rotational movement of the planet carrier 34 is enabled. The second lock element 38b is arranged axially between the second electromagnet 37b and the internal gear 35 and is adjustable by means of the second electromagnet 37b in the axial direction A between the blocking position and a release position in which the rotational movement of the internal gear 35 is enabled.

In the illustration of FIG. 7, only the first lock element 38a is situated in the blocking position, in which it prevents a rotational movement of the planet carrier 34, but not the second lock element 38b. A rotation of the drive shaft 31 about the axis of rotation D in a first direction of rotation d1 and of a sun gear 39, which is arranged rotationally conjointly on the drive shaft 31, likewise in the first direction of rotation d1 has the result that the planet gears 40 which are rotatably arranged on the planet carrier 34 and connected in terms of drive to the sun gear 39 is, by connection in terms of drive to the internal gear 35, via an internal toothing which is provided on the inner circumference on the internal gear 35 but which is not illustrated in FIG. 7 for the sake of clarity, set in rotational movement about the axis of rotation D in a second direction of rotation D2 which is opposite to the first direction of rotation d1. The internal gear 35, which is connected in terms of drive to the output shaft 32 via the freewheel 41, thus causes a rotational movement of the output shaft 33 in the second direction of rotation d2. The course of the drive connection between drive shaft 31 and output shaft 32 is indicated in the figure by a dotted line with the reference designation 43.

Figure 8:
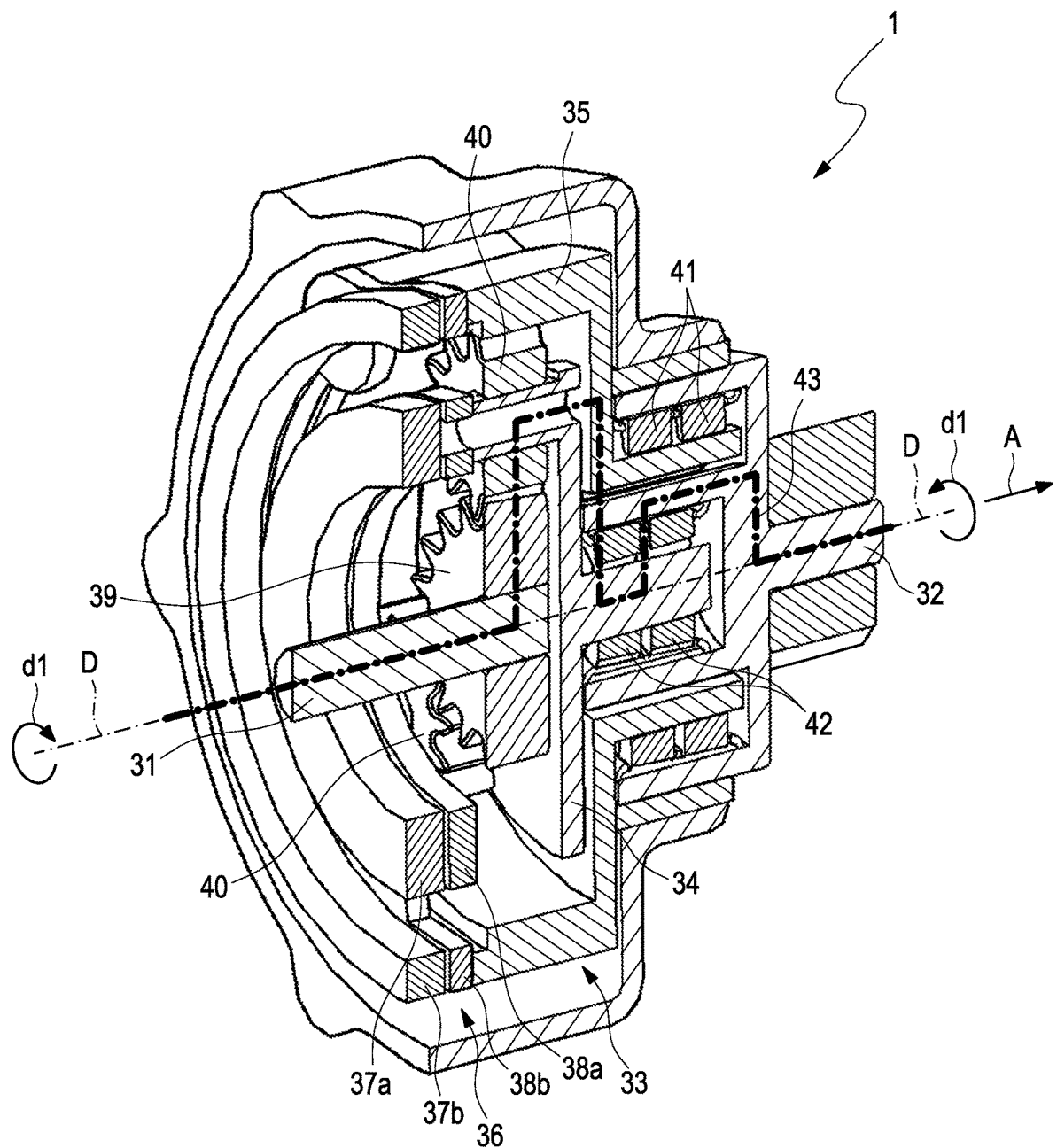

In the illustration of FIG. 8, only the second lock element 38a is situated in the blocking position, in which it prevents a rotational movement of the internal gear 35, but not the first lock element 38a. A rotation of the drive shaft 31 in the first direction of rotation d1 about the axis of rotation D and of the sun gear 39, which is arranged rotationally conjointly on the drive shaft 31, likewise in the first direction of rotation d1 has the result that the planet gears 40 which are arranged rotatably on the planet carrier 34 and which are connected in terms of drive to the sun gear 39 set the planet carrier 34 in a rotational movement about the axis of rotation D in the first direction of rotation d1. The planet carrier 34, which is connected in terms of drive to the output shaft 32 via the freewheel 42, thus causes a rotational movement of the output shaft 32 in the first direction of rotation d1, that is to say in the same direction as the drive shaft 31.

By switching of the two electromagnets 37a, 37b between the two states discussed in FIGS. 7 and 8, it is thus possible—with an unchanging first direction of rotation d1 of the drive shaft 32—for the direction of rotation of the output shaft 33 to be alternated such that this rotates—as discussed on the basis of FIG. 7—in the second direction of rotation d2, that is to say oppositely to the first direction of rotation D1 of the drive shaft 31, or—as discussed on the basis of FIG. 8—in the first direction of rotation d1, that is to say in the direction of rotation d1 of the drive shaft 32. The planetary stage 33 can thus be used to adjust an actuator (not shown), which is connected in terms of drive to the output shaft 32, of the parking lock 1 in mutually opposite directions by means of the output shaft 33, with an unchanging direction of rotation d1 of the drive shaft 31.

Figure 9:
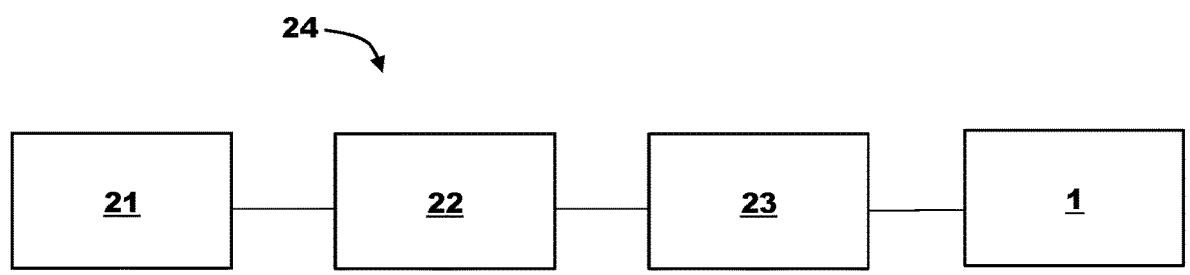
FIG. 9 shows schematically an example of a transmission for a motor vehicle with a parking lock according to the first aspect or the second aspect of the invention.

As shown in FIG. 9, a transmission 24 with a parking lock 1 is shown schematically. The transmission includes a filter device 21 for filtering transmission oil, an electrically driven conveying device 22 for driving the transmission oil through the filter device 21, and an electric drive 23 for driving the conveying device 22. The electric drive 23 is drive-connected to the parking lock 1 for activating the parking lock 1.

The invention claimed is:

1. A parking lock for a transmission of an electric or hybrid vehicle, comprising:
a lock device including an actuatable actuating element and a setting element that is adjustable between a deployed position and a retracted position, the locking device structured and arranged such that, in response to repeated actuation of the actuating element, the setting element is, via a coupling mechanism, adjusted alternately between the retracted position and the deployed position,
a camshaft rotatable about an axis of rotation and a cam arranged on the camshaft that is connected in terms of drive to the lock device, the cam being coordinated with the lock device such that, when the camshaft rotates, the actuating element is actuated by the cam,
a ratchet wheel rotatable about a wheel axis and having a pawl that is adjustable between an engagement position, where the pawl blocks a rotation of the ratchet wheel about the wheel axis, and a release position, where the blocking of the ratchet wheel is released, wherein the setting element is structured and arranged to adjust the pawl between the engagement position and the release position, and wherein the setting element has a contact section that is mechanically in contact with the pawl to form a drive connection to the pawl and, for the adjustment of the pawl, tapers along an axial direction.

2. The parking lock according to claim 1, wherein the setting element is connected in terms of drive to the pawl such that the pawl has been adjusted into the engagement position when the setting element is situated in the deployed position, and the pawl has been adjusted into the release position when the setting element is situated in the retracted position.

3. The parking lock according to claim 1, wherein the lock device further includes a preload unit that preloads the pawl in a direction of the release position.

4. The parking lock according to claim 3, wherein the preload unit comprises a spiral spring.

5. The parking lock according to claim 1, wherein the coupling mechanism between the actuating element and the setting element comprises a spring.

6. The parking lock according to claim 1, wherein the actuating element and the setting element are actuatable or adjustable along a common axial direction.

7. The parking lock according to claim 1, wherein the contact section tapers conically along the axial direction.

8. The parking lock according to claim 1, wherein the cam is arranged rotationally conjointly on the camshaft.

9. The parking lock according to claim 1, wherein:
the camshaft is connected in terms of drive to the cam via a mechanically or electrically or electromechanically activatable delay device, and
the delay device is configured such that, after being activated, the delay device temporarily blocks a rotational movement of the cam even when the camshaft is rotating.

10. The parking lock according to claim 9, wherein:
the delay device includes an adjustable blocking element that interacts with a stop disposed on the cam such that, in response to activation of the delay device, said blocking element is adjusted into a blocking position where the blocking element blocks a movement of the stop and of the cam,
the delay device has a preload device that preloads the blocking element away from the blocking position, and
the delay device has a damping device that counteracts the movement of the blocking element away from the blocking position as generated by the preload device, such that the elimination of the blockage owing to the movement of the blocking element away from the blocking position takes place in a time-delayed manner.

11. A transmission for a motor vehicle, comprising:
a transmission output and a parking lock, the parking lock including:
a lock device including an actuatable actuating element and a setting element that is adjustable between a deployed position and a retracted position, the locking device structured and arranged such that, in response to repeated actuation of the actuating element, the setting element is, via a coupling mechanism, adjusted alternately between the retracted position and the deployed position, a camshaft rotatable about an axis of rotation and a cam arranged on the camshaft that is connected in terms of drive to the lock device, the cam being coordinated with the lock device such that, when the camshaft rotates, the actuating element is actuated by the cam, a ratchet wheel rotatable about a wheel axis and having a pawl that is adjustable between an engagement position, where the pawl blocks a rotation of the ratchet wheel about the wheel axis, and a release position, where the blocking of the ratchet wheel is released, wherein the setting element is structured and arranged to adjust the pawl between the engagement position and the release position, wherein the setting element has a contact section that is mechanically in contact with the pawl to provide a drive connection to the pawl, and wherein the contact section tapers along an axial direction for adjusting the pawl, a filter device for filtering transmission oil, an electrically driven conveying device for driving the transmission oil through the filter device, and an electric drive for driving the conveying device, wherein the electric drive is, for activating the parking lock, connected in terms of drive to the lock device of the parking lock.

12. The transmission according to claim 11, wherein the setting element is drive-connected to the pawl such that the pawl has been adjusted into the engagement position when the setting element is situated in the deployed position, and the pawl has been adjusted into the release position when the setting element is situated in the retracted position.

13. The transmission according to claim 11, wherein the lock device further includes a preload unit that preloads the pawl in a direction of the release position.

14. The transmission according to claim 11, wherein the actuating element and the setting element are adjustable along a common axial direction.

15. The transmission according to claim 11, wherein the contact section conically tapers along the axial direction.

16. The transmission according to claim 11, wherein the cam is arranged rotationally conjointly on the camshaft.

17. The transmission according to claim 11, wherein the camshaft is drive-connected to the cam via a delay device, and wherein the delay device is structured and arranged such that, after being activated, the delay device temporarily blocks a rotational movement of the cam even when the camshaft is rotation.

18. The transmission according to claim 17, wherein:
the delay device includes an adjustable blocking element that interacts with a stop disposed on the cam such that, in response to activation of the delay device, said blocking element is adjusted into a blocking position where the blocking element blocks a movement of the stop and of the cam,
the delay device a preload device that preloads the blocking element away from the blocking position, and
the delay device includes an electromagnet that counteracts the movement of the blocking element away from the blocking position as generated by the preload device, such that the elimination of the blockage owing to the movement of the blocking element away from the blocking position takes place in a time-delayed manner.

19. A parking lock for a transmission of an electric or hybrid vehicle, comprising:

a lock device including an actuatable actuating element and a setting element that is adjustable between a deployed position and a retracted position, the locking device structured and arranged such that, in response to repeated actuation of the actuating element, the setting element is, via a coupling mechanism, adjusted alternately between the retracted position and the deployed position, a camshaft rotatable about an axis of rotation and a cam arranged on the camshaft that is connected in terms of drive to the lock device, the cam being coordinated with the lock device such that, when the camshaft rotates, the actuating element is actuated by the cam, a ratchet wheel rotatable about a wheel axis and having a pawl that is adjustable between an engagement position, where the pawl blocks a rotation of the ratchet wheel about the wheel axis, and a release position, where the blocking of the ratchet wheel is released, wherein the setting element is structured and arranged to adjust the pawl between the engagement position and the release position, wherein camshaft is connected in terms of drive to the cam via a mechanically or electrically or electromechanically activatable delay device, the delay device being configured such that, after being activated, the delay device temporarily blocks a rotational movement of the cam even when the camshaft is rotating, the delay device including an adjustable blocking element that interacts with a stop disposed on the cam such that, in response to activation of the delay device, said blocking element is adjusted into a blocking position where the blocking element blocks a movement of the stop and of the cam, the delay device further including a preload device that preloads the blocking element away from the blocking position, and wherein the delay device further includes a damping device that counteracts the movement of the blocking element away from the blocking position as generated by the preload device, such that the elimination of the blockage owing to the movement of the blocking element away from the blocking position takes place in a time-delayed manner.

20. The parking lock according to claim 19, wherein the preload device of the delay device comprises a spring.

\* \* \* \* \*